(12) United States Patent
Jang et al.

(10) Patent No.: US 12,112,326 B2
(45) Date of Patent: Oct. 8, 2024

(54) METHOD, COMPUTER DEVICE, AND NON-TRANSITORY COMPUTER-READABLE RECORDING MEDIUM TO AVOID MISDEPOSIT OF VIRTUAL CURRENCY

(71) Applicant: LY Corporation, Tokyo (JP)

(72) Inventors: Miyoung Jang, Seongnam-si (KR); Beom Woo Moon, Seongnam-si (KR); Jaeman Kim, Seongnam-si (KR); Hyun Dong Lee, Seongnam-si (KR); Ui Seok Shim, Seongnam-si (KR); Dong Hwan Kim, Seongnam-si (KR)

(73) Assignee: LY Corporation, Tokyo (JP)

( * ) Notice: Subject to any disclaimer, the term of this patent is extended or adjusted under 35 U.S.C. 154(b) by 82 days.

(21) Appl. No.: 17/860,663

(22) Filed: Jul. 8, 2022

(65) Prior Publication Data

US 2023/0010607 A1    Jan. 12, 2023

(30) Foreign Application Priority Data

Jul. 9, 2021  (KR) ........................ 10-2021-0090114

(51) Int. Cl.
*G06Q 20/40* (2012.01)
*G06Q 20/36* (2012.01)
*G06Q 40/04* (2012.01)

(52) U.S. Cl.
CPC ........... *G06Q 20/401* (2013.01); *G06Q 20/36* (2013.01); *G06Q 40/04* (2013.01)

(58) Field of Classification Search
CPC ........ G06Q 20/06; G06Q 20/10; G06Q 20/36; G06Q 20/38; G06Q 20/065; G06Q 20/108

See application file for complete search history.

(56) References Cited

U.S. PATENT DOCUMENTS

| | | | |
|---|---|---|---|
| 2018/0082268 A1* | 3/2018 | Sheerin | G06Q 20/4014 |
| 2018/0191503 A1* | 7/2018 | Alwar | H04L 9/3242 |
| 2019/0164150 A1* | 5/2019 | Lee | G06Q 20/42 |
| 2019/0272534 A1* | 9/2019 | Griffith | G06Q 20/02 |
| 2021/0105142 A1* | 4/2021 | Lee | H04L 9/3247 |

FOREIGN PATENT DOCUMENTS

| | | | | |
|---|---|---|---|---|
| KR | 10-2019-0024601 A | | 3/2019 | |
| KR | 20210007928 A | * | 8/2020 | ......... G06Q 20/3829 |

\* cited by examiner

*Primary Examiner* — Scott S Trotter
(74) *Attorney, Agent, or Firm* — Sughrue Mion, PLLC

(57) ABSTRACT

A method, a computer device, and a non-transitory computer-readable recording medium for preventing an erroneous deposit of cryptocurrency are provided. A method of preventing an erroneous deposit of cryptocurrency includes providing an interface for inputting transaction request information including a target coin and a wallet address; verifying at least one of the target coin and the wallet address using a trading environment of a target exchange corresponding to the transaction request information; and processing a transaction according to the transaction request information based on a verification result.

19 Claims, 12 Drawing Sheets

| Alias | Actual address (coin type, address) |
|---|---|
| AAA | BTC, 1Abcdef2GHIJK3lmnoqu123AA |
| BBB | BTC, 1Abcdef2GHIJK3lmnoqu456BB |
| ABC | BTC, 1Abcdef2GHIJK3lmnopq789CC |

METHOD, COMPUTER DEVICE, AND NON-TRANSITORY COMPUTER-READABLE RECORDING MEDIUM TO AVOID MISDEPOSIT OF VIRTUAL CURRENCY

CROSS-REFERENCE TO RELATED APPLICATION(S)

This application claims the benefit of priority under 35 U.S.C. § 119 to Korean Patent Application No. 10-2021-0090114, filed Jul. 9, 2021, the entire contents of which are incorporated herein by reference in their entirety.

BACKGROUND

1. Technical Field

Apparatuses and methods consistent with example embodiments relate to technology for preventing an erroneous deposit of cryptocurrency.

2. Description of the Related Art

With the advent of encryption technology, interest in a cryptocurrency based on encryption technology is significantly increasing.

A representative example of a cryptocurrency includes Bitcoin (BTC). In addition thereto, Link (LN), Ethereum (ETH), Ripple (XRP), Litecoin (LTC), DASH, EOS, and Bitcoin Cash (BCH) are leading the cryptocurrency market.

Unlike the traditional currency issued by the government or the central bank, such cryptocurrencies are traded according to regulations set by original creators and are being distributed based on blockchain technology.

In the related art, a technology for trading a cryptocurrency using a private key is provided to authorize a trading through a transaction verification server and confirm the trading based on whether the trading is authorized by the transaction verification server.

SUMMARY

One or more example embodiments may provide a method and an apparatus for preventing an erroneous deposit of cryptocurrency using information on a target exchange when remitting the cryptocurrency, and verifying remittance request information input from a user through a trading environment of a target exchange.

Further, one or more example embodiments may provide a method and an apparatus for managing a recipient address as an alias and providing an automatic address input function using the alias.

Still further, one or more example embodiments may provide a method and an apparatus for verifying whether a recipient address included in a remittance request is an address registered as an erroneous deposit damage case.

Still further, one or more example embodiments may provide a method and an apparatus for displaying a watermark for cryptocurrency to be traded on a user screen for cryptocurrency trading.

Still further, one or more example embodiments may provide a method and an apparatus for proceeding with a transaction after a user confirmation through typing for cryptocurrency that a user desires to trade.

Still further, one or more example embodiments may provide a method and an apparatus for primarily remitting a portion of a transaction request quantity and then remitting a remaining quantity after authorization for a corresponding remittance.

According to an aspect of at least one example embodiment, there is provided a method of preventing an erroneous deposit of cryptocurrency executed by a computer device including at least one processor configured to execute computer-readable instructions included in a memory, the method including providing an interface for inputting transaction request information including a target coin and a wallet address; verifying at least one of the target coin and the wallet address using a trading environment of a target exchange corresponding to the transaction request information; and processing a transaction according to the transaction request information based on a result of verifying the at least one of the target coin and the wallet address.

The verifying may include verifying the wallet address by verifying an address belonging to the target exchange.

The verifying may include verifying the target coin by verifying a coin type tradable in the target exchange.

The verifying may include verifying the wallet address by verifying a network type processible in the target exchange.

The verifying may include verifying the wallet address by verifying an address registered as an erroneous deposit damage case.

The verifying may include verifying the trading environment of the target exchange through a database system included in the computer device, another external system interactable with the computer device, or an exchange application program interface (API).

The processing may include performing a primary remittance for a portion of a transaction request quantity; and performing an additional remittance for a remaining quantity of the transaction request quantity in response to the primary remittance being authorized.

The performing of the primary remittance may include remitting a quantity corresponding to a singular value that is randomly determined for the transaction request information, and the performing of the additional remittance may include remitting the remaining quantity in response to a success in authorization using the singular value.

The performing of the additional remittance may include remitting the remaining quantity in response to a success in authorization using a transaction ID that represents a transaction of the primary remittance.

The providing may include recommending a list of addresses managed using an alias on an interface for inputting the wallet address.

The providing may include recommending a list of addresses based on a user transaction history on an interface for inputting the wallet address.

The providing may include recommending an address system of the target coin or the target exchange on an interface for inputting the wallet address in response to the target coin or the target exchange being input first.

The providing may include recommending a list of exchanges that trade the target coin on an interface for inputting the target exchange in response to the target coin being input first.

The providing may include recommending a list of coins tradable in the target exchange on an interface for inputting the target coin, in response to the target exchange being input first.

The providing may include displaying a watermark on information input through the interface as a background of the interface.

The providing may include providing an interface for a user confirmation for the target coin in response to the target coin being input through the interface.

According to an aspect of at least one example embodiment, there is provided a non-transitory computer-readable recording medium storing instructions that, when executed by a processor, cause the processor to perform the method.

According to an aspect of at least one example embodiment, there is provided a computer device including at least one memory storing computer-readable instructions; and at least one processor configured to execute the computer-readable instructions to: provide an interface for inputting transaction request information including a target coin and a wallet address; verify at least one of the target coin and the wallet address using a trading environment of a target exchange corresponding to the transaction request information; and process a transaction according to the transaction request information based on a result of verifying the at least one of the target coin and the wallet address.

The at least one processor may be further configured to verify the target coin by verifying a coin type tradable in the target exchange, or to verify the wallet address by verifying at least one of an address belonging to the target exchange and a network type processible in the target exchange.

The at least one processor may be further configured to perform a primary remittance for a portion of a transaction request quantity, and to perform an additional remittance for a remaining quantity of the transaction request quantity through authorization for the primary remittance

BRIEF DESCRIPTION OF DRAWINGS

The above and/or other aspects will be more apparent by describing certain example embodiments, with reference to the accompanying drawings, in which:

FIGS. 7 to 12 illustrate examples of a cryptocurrency transaction screen according to at least one example embodiment.

DETAILED DESCRIPTION

Figure 1:
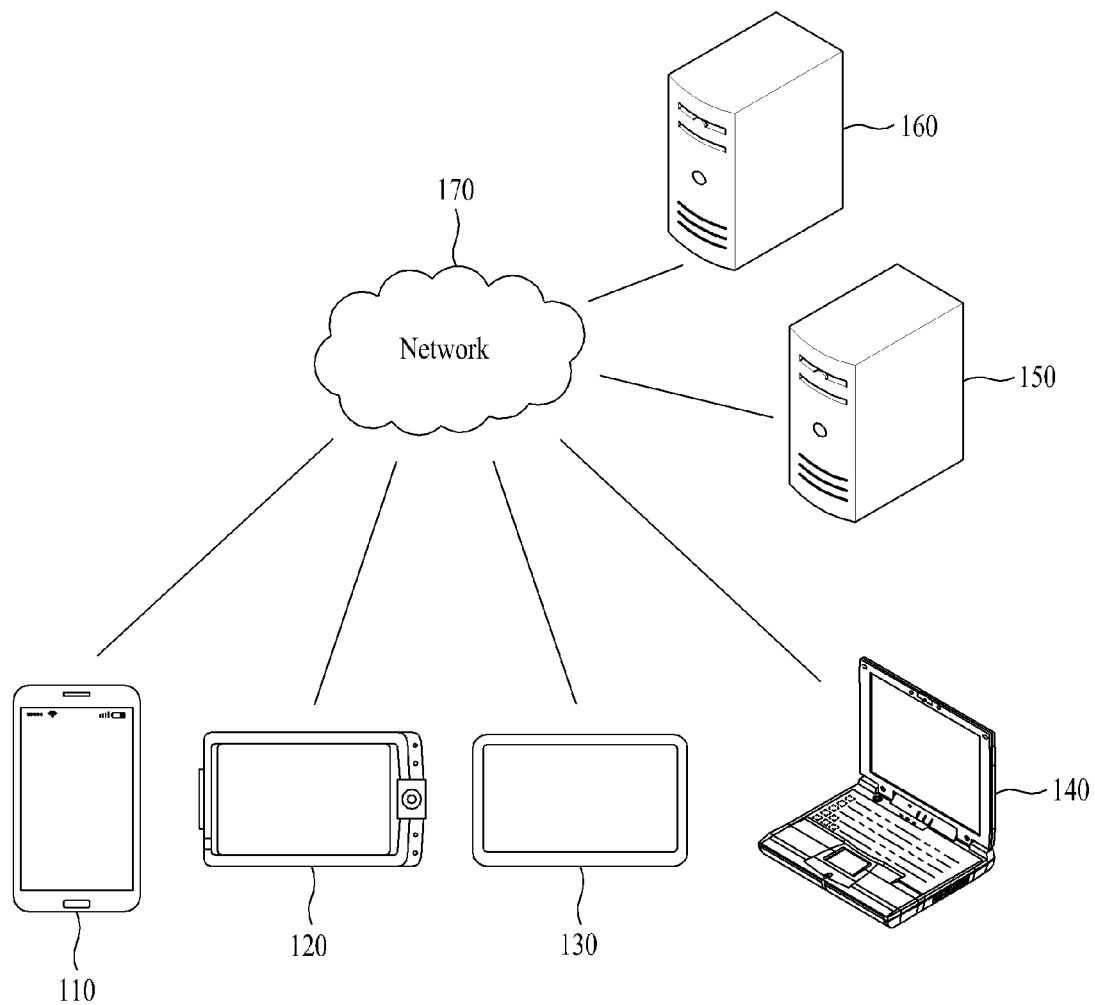
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for preventing an erroneous deposit when trading a cryptocurrency.

Example embodiments including the disclosures herein may prevent an erroneous deposit of cryptocurrency through a verification using a trading environment of a target exchange in response to a transaction request from a user.

A system for preventing an erroneous deposit of cryptocurrency according to example embodiments may be implemented by at least one computer device and a method of preventing an erroneous deposit of cryptocurrency according to example embodiments may be performed through at least one computer device included in the system for preventing an erroneous deposit of cryptocurrency. Here, a computer program according to an example embodiment may be installed and run on the computer device, and the computer device may perform the method of preventing an erroneous deposit of cryptocurrency according to example embodiments under control of the running computer program. The computer program may be stored in a non-transitory computer-readable recording medium to implement the method of preventing an erroneous deposit of cryptocurrency according to example embodiments in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is described as one example among environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service (e.g., a cryptocurrency trading service) to the plurality of electronic devices 110, 120, 130, and 140 connected over the network 170.

Figure 2:
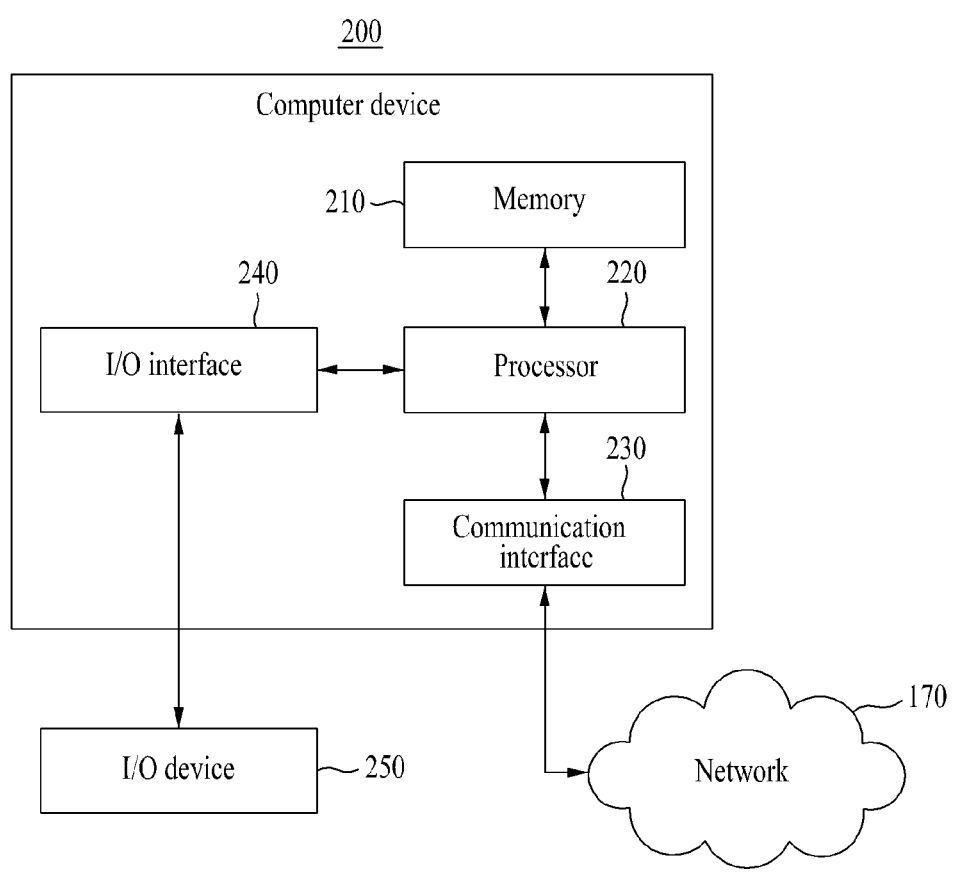
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or the servers 150 and 160 may be implemented in a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. The permanent mass storage device, such as ROM and disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files provided over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function or a structure for communication between the computer device 200 and other apparatuses, for example, the aforementioned storage devices, over the network 170. For example, the processor 220 of the computer device 200 may transfer a request or an instruction created based on a program code stored in the storage device such as the memory 210, data, file, etc., to the other apparatuses over the network 170 under control of the communication interface 230. Inversely, a signal, an instruction, data, a file, etc., from another apparatus may be received at the computer device 200 through the network 170 and the communication interface 230 of the computer device 200. For example, a signal, an instruction, data, etc., received through the communication interface 230 may be transferred to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with a device in which an input function and an output function are integrated into a single function, such as a touchscreen. At least one I/O device 250 may be configured as a single device with the computer device 200.

According to other example embodiments, the computer device 200 may include a number of components greater than or less than a number of components shown in FIG. 2. However, there is no need to clearly illustrate many components according to the related art. For example, the computer device 200 may include at least a portion of the I/O device 250, or may further include other components, for example, a transceiver, a database (DB), and the like.

Hereinafter, example embodiments of a method and system for preventing an erroneous deposit of a cryptocurrency exchange are described.

Figure 3:
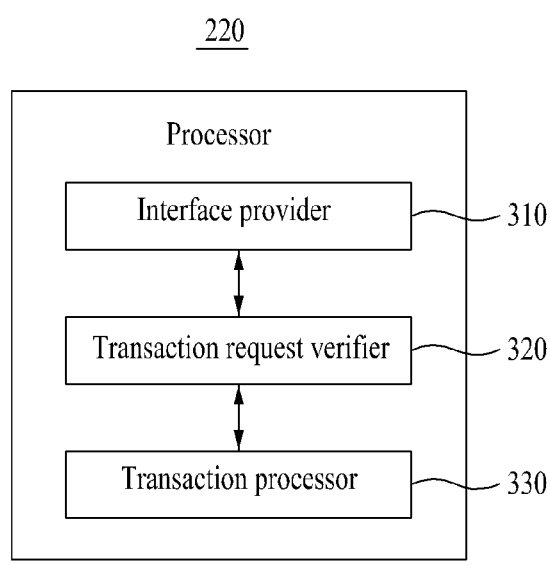
FIG. 3 is a diagram illustrating an example of a component includable in a processor of a computer device according to at least one example embodiment.
Figure 4:
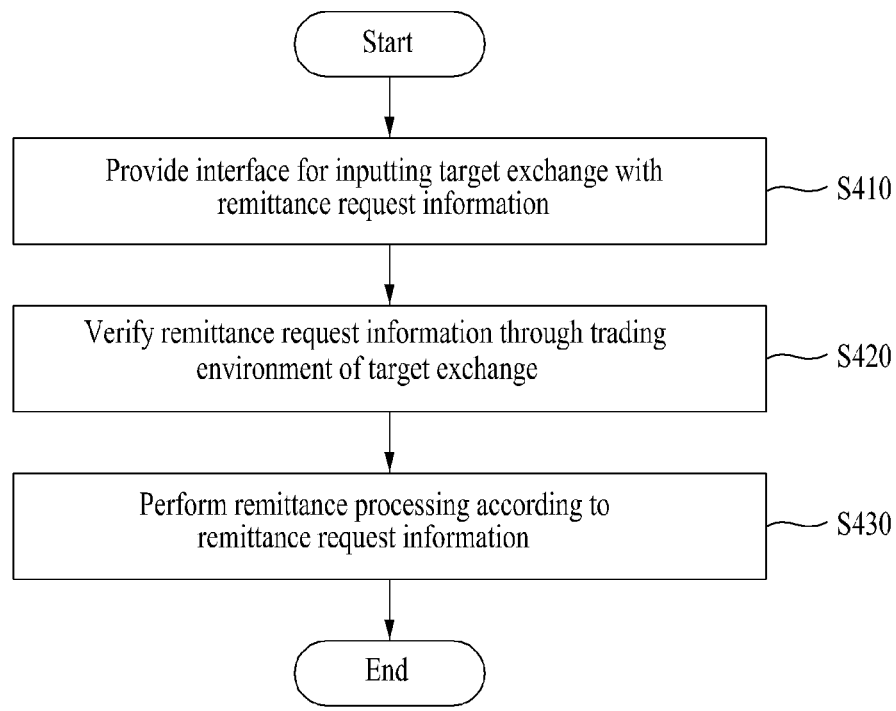
FIG. 4 is a flowchart illustrating an example of a method performed by a computer device according to at least one example embodiment.

FIG. 3 is a diagram illustrating an example components of a processor of a computer device according to at least one example embodiment, and FIG. 4 is a flowchart illustrating an example of a method of preventing an erroneous deposit of cryptocurrency by a computer device according to at least one example embodiment.

The computer device 200 according to the example embodiment functions as a platform that provides a cryptocurrency trading service. A system for preventing an erroneous deposit of cryptocurrency may be configured in the computer device 200. The computer device 200 may provide a cryptocurrency trading service through connection to an exclusive application installed on the electronic devices 110, 120, 130, and 240 or a website or mobile site related to the computer device 200 with respect to the plurality of electronic devices 110, 120, 130, and 140 that are clients. In particular, the computer device 200 may provide a plurality of schemes for preventing erroneous deposit in the cryptocurrency trading service.

Referring to FIG. 3, the processor 220 of the computer device 200 may include an interface provider 310, a transaction request verifier 320, and a transaction processor 330 as components to perform the method of preventing an erroneous deposit of cryptocurrency of FIG. 4. Depending on example embodiments, the components of the processor 220 may be selectively included in or excluded from the processor 220. Also, depending on example embodiments, the components of the processor 220 may be separated or merged for representations of functions of the processor 220.

The processor 220 and the components of the processor 220 may control the computer device 200 to perform operations S410 to S430 of the method of preventing an erroneous deposit of cryptocurrency of FIG. 4. For example, the processor 220 and the components of the processor 220 may be configured to execute an instruction according to a code of at least one program and a code of an OS stored in the memory 210.

Here, the components of the processor 220 may be representations of different functions performed by the processor 220 in response to an instruction provided from the program code stored in the computer device 200. For example, the interface provider 310 may be used as a functional representation of the processor 220 that controls the computer device 200 to provide an interface for inputting transaction request information in response to the instruction.

The processor 220 may read instructions from the memory 210 to control operations of the computer device 200. In this case, the read instruction may include an instruction for controlling the processor 220 to perform the following operations S410 to S430.

The following operations S410 to S430 may be performed in order different from the order illustrated in FIG. 4 and a portion of operations S410 to S430 may be omitted. Alternatively, an additional process may be further included.

A cryptocurrency remittance may require three pieces of information, that is, a type and a quantity of cryptocurrency to be remitted (hereinafter, also referred to as "coin" in the same meaning) and a recipient wallet address. A wallet address is to identify an account on a cryptocurrency exchange and may be created and managed by the cryptocurrency exchange. For example, a wallet address system may use an address for identifying the cryptocurrency exchange and/or a tag for identifying a user. Depending on an address system, information for identifying an exchange and a user may be expressed using a single system without distinguishing an exchange address and a user tag.

Using this wallet address, it is possible to request a cryptocurrency trading. Also, a wallet address suitable for a target coin to be remitted is required for a remittance.

Dissimilar to a bank transaction process, the wallet address has difficulty in terms of verifying account information of a recipient. Therefore, an erroneous input of cryptocurrency may occur in various situations, for example, such as a case in which the wallet address is erroneously input due to typos or a non-entering tag when requesting a remittance, a case in which the wallet address does not match a target coin, a case in which the target coin is not treated in an exchange of the wallet address, and a case in which an address system of the wallet address is not supported in the exchange.

The example embodiments propose a method that may solve an erroneous deposit issue occurring due to a cryptocurrency transmission structure.

Referring to FIG. 4, in operation S410, the interface provider 310 may provide an interface for inputting remittance request information on a user screen for cryptocurrency trading in response to a user request. The interface provider 310 may provide an interface for inputting a type and a quantity of a target coin to be remitted and a recipient wallet address as the remittance request information for a cryptocurrency remittance, and more particularly, may provide an interface for inputting a cryptocurrency exchange, that is, a target exchange in which the recipient wallet address is present with the remittance request information. That is, the interface provider 310 may request a user input for the target exchange in the process of inputting the type and the quantity of the target coin and the recipient wallet address as the remittance request information.

The interface provider 310 may provide a list of recommended addresses through the interface for inputting the recipient wallet address to assist an input of accurate information. For example, the interface provider 310 may provide a list of addresses registered using an alias through a user setting as a list of recommended addresses. The alias may be used to identify a destination of a coin or token. The processor 220 may manage a coin type and wallet address pair using an alias designated by the user and the interface provider 310 may fetch and display a list of addresses registered using an alias when the user is to input the recipient wallet address. As another example, the interface provider 310 may provide a list of addresses selected based on a user transaction history as a list of recommended addresses. For example, the processor 220 may separately manage a wallet address used by the user for a transaction for a recent certain period, a wallet address frequently used by the user more than a desired number of times or frequency, a wallet address verified through a user confirmation for a transaction history among wallet addresses used by the user for a transaction, and the like. The interface provider 310 may fetch and display a list of addresses separately managed when the user desires to input the recipient wallet address.

The interface provider 310 may provide a recommendation function for an address system through the interface for inputting the recipient wallet address to assist an input of accurate information. Similar to an autocomplete function, in the case of inputting the recipient wallet address after inputting the target coin or the target exchange, the interface provider 310 may recommend an address system supported by an exchange that handles the target coin or the target exchange. In addition to the recommendation function for the address system, the interface provider 310 may provide a recommendation function based on information which can be input subsequent to the previously input information. For example, when the target exchange is input first, the interface provider 310 may provide a list of coins tradable in the target exchange as a recommendation for the target coin. When the target coin is input first, the interface provider 310 may provide a list of exchanges that handle the target coin as a recommendation for the target exchange. For the recommendation function, the processor 220 may collect an address system supported by each exchange and a tradable coin type for each exchange through interaction with a $3^{rd}$ party system or another external system, such as various sites that provide cryptocurrency information, in addition to a self-database system, and may manage the collected address system and coin type through a separate table or may verify the same through a real-time search.

The interface provider 310 may display a watermark for information input from the user on the user screen for inputting information to assist an input of accurate information. For example, the interface provider 310 may display a watermark representing a corresponding coin type as a screen background when a user inputs a target coin to be remitted. In addition to the coin type, a watermark for information that is most initially input in the remittance request information may be used as the screen background. When the recipient wallet address is most initially input, the interface provider 310 may display an alias of the corresponding wallet address as the watermark. When the target exchange is most initially input, the interface provider 310 may display an exchange name as the watermark. Depending on cases, the interface provider 310 may change the watermark with previously input information and display the same at a point in time at which next information is to be input. For example, with the assumption that input is performed in order of a target coin, a recipient wallet address, and a target exchange, the interface provider 310 may display a watermark for the target coin when inputting the recipient wallet address and may display a watermark for an address alias input as the recipient wallet address when inputting the target exchange after inputting the recipient wallet address.

The interface provider 310 may automatically modify a graphic user interface of a cryptocurrency transaction application (that is downloaded from a server and is installed on a client terminal), based on an event that requires a display of a watermark. The interface provider 310 may refer to a memory that includes storage times (e.g., a time stamp) of various information (e.g., a recipient wallet address, a target exchange, etc.) that are input as the remittance request information, to identify the most recently input information among the various information input as the remittance request information. Based on the most recently input information, the interface provider 310 may update a watermark to be displayed on the graphic user interface of the cryptocurrency transaction application.

In operation S420, the transaction request verifier 320 may verify the remittance request information of the user through a trading environment of the target exchange input from the user. The transaction request verifier 320 may verify information input from the user for a remittance request and then guide a verification result to the user and may determine whether to perform a remittance procedure according to a user selection. For example, the transaction request verifier 320 may perform a verification on the recipient wallet address by verifying whether the recipient wallet address input from the user is an address that belongs to the target exchange. As another example, the transaction request verifier 320 may perform a verification on the target coin by verifying whether the target coin input from the user is a coin tradable in the target exchange. As still another example, the transaction request verifier 320 may perform an additional verification on the recipient wallet address by verifying whether a network type of the recipient wallet address input from the user is an address type processible in the target exchange. As still another example, the transaction request verifier 320 may perform an additional verification on the recipient wallet address by verifying whether the recipient wallet address input from the user is an address that is registered as an erroneous deposit damage case. When verifying the recipient wallet address and the target coin, the transaction request verifier 320 may perform a verification process by fetching information on the target exchange through a database constructed as a system included in the computer device 200 or another external system interactable with the computer device 200. The transaction request verifier 320 may also perform the verification process by directly interacting with a system of the target exchange through an exchange application program interface (API). The transaction request verifier 320 may apply one of the aforementioned verification schemes or may apply a combination of at least two combination schemes. Therefore, the transaction request verifier 320 may verify the recipient wallet address and the target coin that the user desires to remit based on an environment actually tradable in the target exchange.

In operation S430, the transaction processor 330 may perform remittance processing according to the remittance request information of the user. When the user desires to proceed with a remittance procedure for the remittance request information verified through operation S420, the transaction processor 330 may proceed with the remittance procedure according to the remittance request information.

For example, in response to a success in an authorization for primary remittance details after the user proceeds with a primary remittance procedure of primarily remitting a portion of the entire quantity the user requests to remit for a safe transaction, the transaction processor 330 may proceed with an additional remittance procedure for a remaining quantity. The primary remittance quantity may correspond to a remittable minimum unit. Here, a minimum remittance unit may be predetermined for each coin type. Depending on example embodiments, the primary remittance quantity may be determined as a singular value that is randomly determined for each remittance. The singular value may be a number selected via random number generation. Here, the transaction processor 330 may primarily remit a quantity corresponding to the singular value and may perform an authorization for primary remittance details by requesting a user input for at least a portion (e.g., last three digit numbers) in the singular value of the primary remittance quantity. When a value input from the user matches the singular value determined as the primary remittance quantity, the transaction processor 330 may perform an additional remittance for the remaining quantity. Depending on cases, the transaction processor 330 may also perform an authorization for the primary remittance details using a transaction ID (TXID; a network ID) that identifies an individual transaction instead of using the singular value. When at least a portion of a value input from the user matches at least a portion of the transaction ID of the primary remittance details by primarily remitting the quantity corresponding to a minimum value or the singular value and by requesting the user input for the transaction ID included in the corresponding remittance details, the transaction processor 330 may perform the additional remittance for the remaining quantity.

Figure 5:
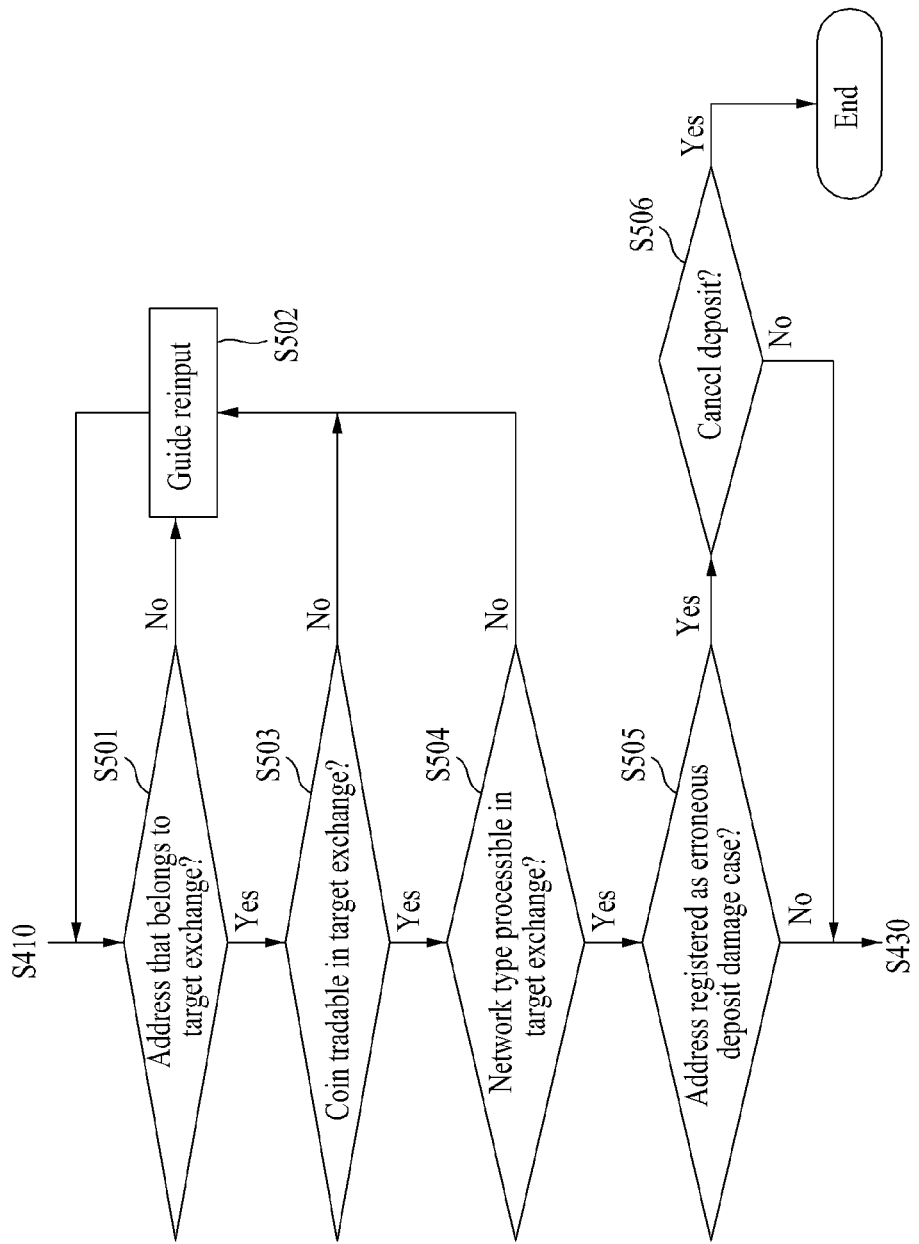
FIG. 5 is a flowchart illustrating an example of a process of verifying remittance request information according to at least one example embodiment.

FIG. 5 is a flowchart illustrating an example of a process of verifying remittance request information according to at least one example embodiment.

Referring to FIG. 5, in operation S501, the transaction request verifier 320 may verify whether the recipient wallet address included in the remittance request information of the user is an address that belongs to the target exchange designated by the user.

In operation S502, when the recipient wallet address is not the address that belongs to the target exchange as a determination result of operation S501, the transaction request verifier 320 may guide a reinput of the recipient wallet address.

When the recipient wallet address is the address that belongs to the target exchange as the determination result of operation S501, the transaction request verifier 320 may verify whether the target coin included in the remittance request information of the user is a type of a coin tradable in the target exchange in operation S503.

When the target coin is not the coin tradable in the target exchange as a determination result of operation S503, the transaction request verifier 320 may guide a reinput of the target coin in operation S502.

When the target coin is the coin tradable in the target exchange as the determination result of operation S503, the transaction request verifier 320 may verify whether the network type of the recipient wallet address is a network type processible in the target exchange in operation S504.

When the network type of the recipient wallet address is not the network type processible in the target exchange as a determination result of operation S504, the transaction request verifier 320 may guide a reinput of the recipient wallet address in operation S502.

When the network type of the recipient wallet address is the network type processible in the target exchange as the determination result of operation S504, the transaction request verifier 320 may verify whether the recipient wallet address is an address registered as an erroneous deposit damage case in operation S505.

When the recipient wallet address is the address registered as the erroneous deposit damage case as a determination result of operation S505, the transaction request verifier 320 may provide an alert guide and may determine whether a remittance is cancelled by the user in operation S506.

When the user requests a remittance cancellation as a determination result of operation S506, the transaction request verifier 320 suspends a remittance procedure.

When the recipient wallet address is not the address registered as the erroneous deposit damage case as the determination result of operation S505 or when the user requests a remittance progress as the determination result of operation S506, the transaction request verifier 320 may deliver the remittance request information of the user to the transaction processor 330.

The aforementioned verification process (operations S501 to S506) may be performed in order different from that of FIG. 5 and a portion of the verification process (operations S501 to S506) may be omitted or an additional process may be further included.

Figure 6:
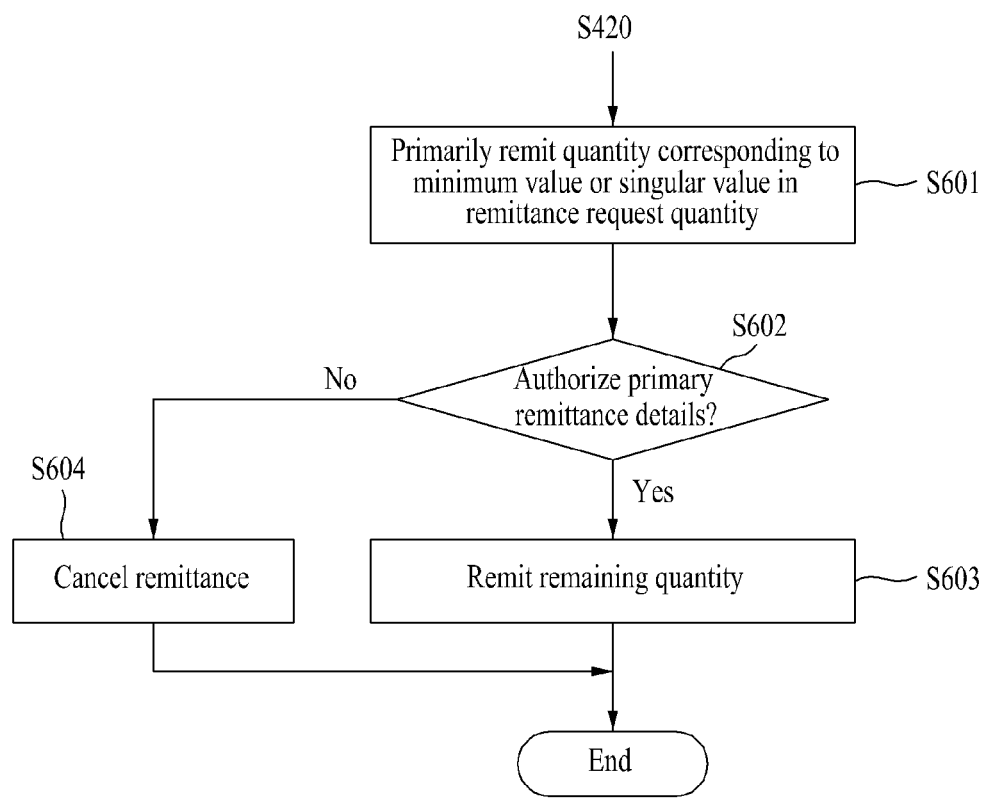
FIG. 6 is a flowchart illustrating an example of a cryptocurrency remittance process according to at least one example embodiment.

FIG. 6 is a flowchart illustrating an example of a cryptocurrency remittance process according to at least one example embodiment.

Referring to FIG. 6, in operation S601, the transaction processor 330 may process a quantity corresponding to a minimum value or a singular value in a quantity of the target coin included in the remittance request information of the user, that is, a remittance request quantity as a primary remittance. Here, the minimum value denotes a quantity of a remittable minimum unit and the singular value denotes a quantity that is randomly determined for a remittance request.

Although the example embodiment describes the primary remittance quantity as a portion of a quantity requested to be remitted by the user, it is provided as an example only. A primary remittance procedure may be performed using assets owned by an exchange instead of using user assets.

In operation S602, when the primary remittance for the remittance request information of the user is completed, the transaction processor 330 may verify whether the primary remittance is authorized according to an authorization procedure using primary remittance details. For example, the transaction processor 330 may perform an authorization for the primary remittance by receiving a transaction ID (TXID; a network ID) according to the primary remittance from the user. In the case of a remittance using the singular value, the transaction processor 330 may perform the authorization for the primary remittance using not the transaction ID but the singular value.

In operation S603, in response to a success in authorizing the primary remittance as an authorization result of operation S602, the transaction processor 330 may proceed with an additional remittance for a remaining quantity in the remittance request quantity in operation S603.

In operation S604, in response to a failure in authorizing the primary remittance as the authorization result of operation S602, the transaction processor 330 may cancel a remittance for the remaining quantity.

The aforementioned remittance processing process (operations S601 to S604) may be performed in order different from order of FIG. 6 and a portion of the verification process (operations S601 to S604) may be omitted or an additional process may be further included.

FIGS. 7 to 12 illustrate examples of a cryptocurrency transaction screen according to at least one example embodiment.

Figure 9:
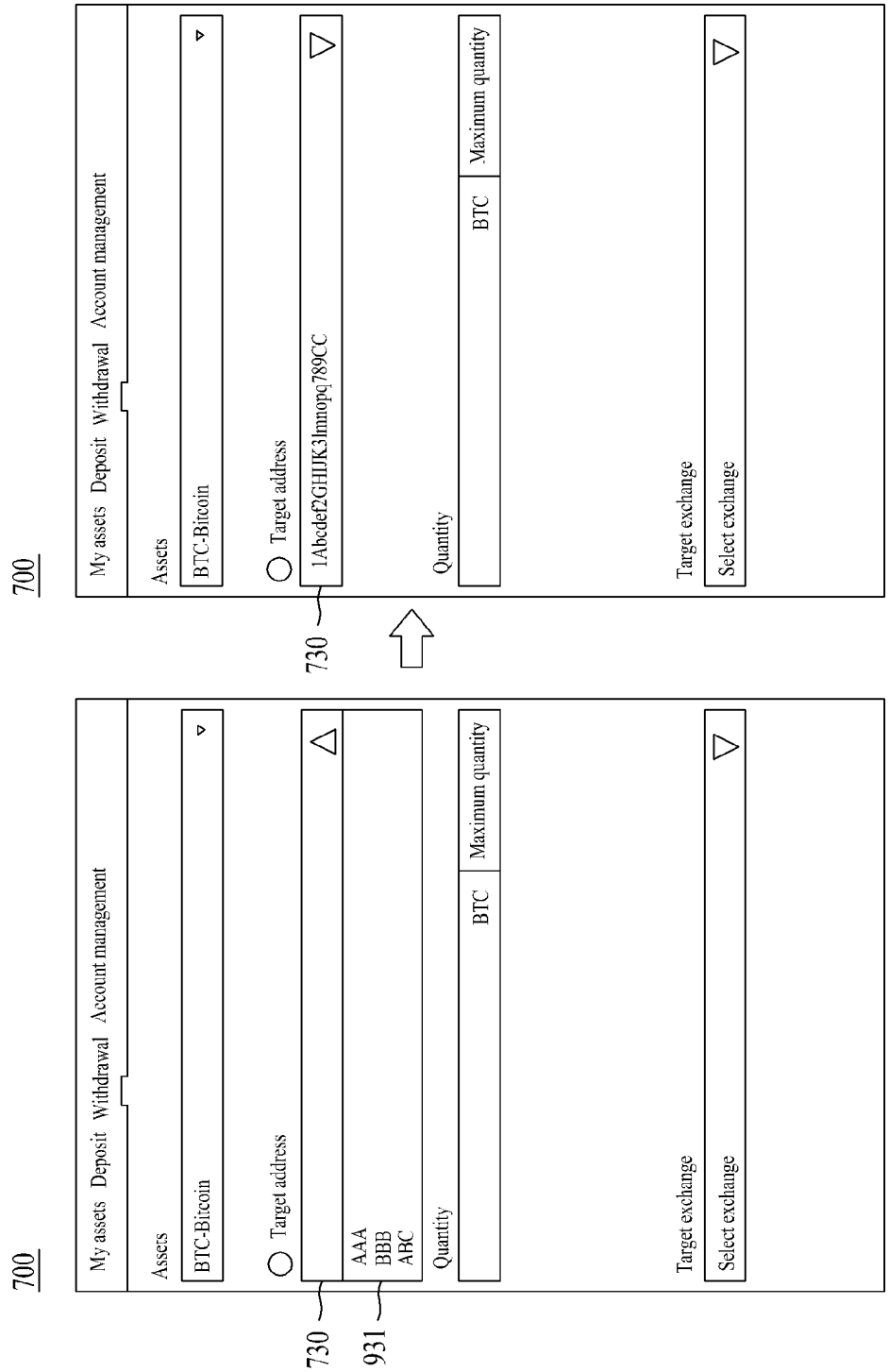
Figure 10:
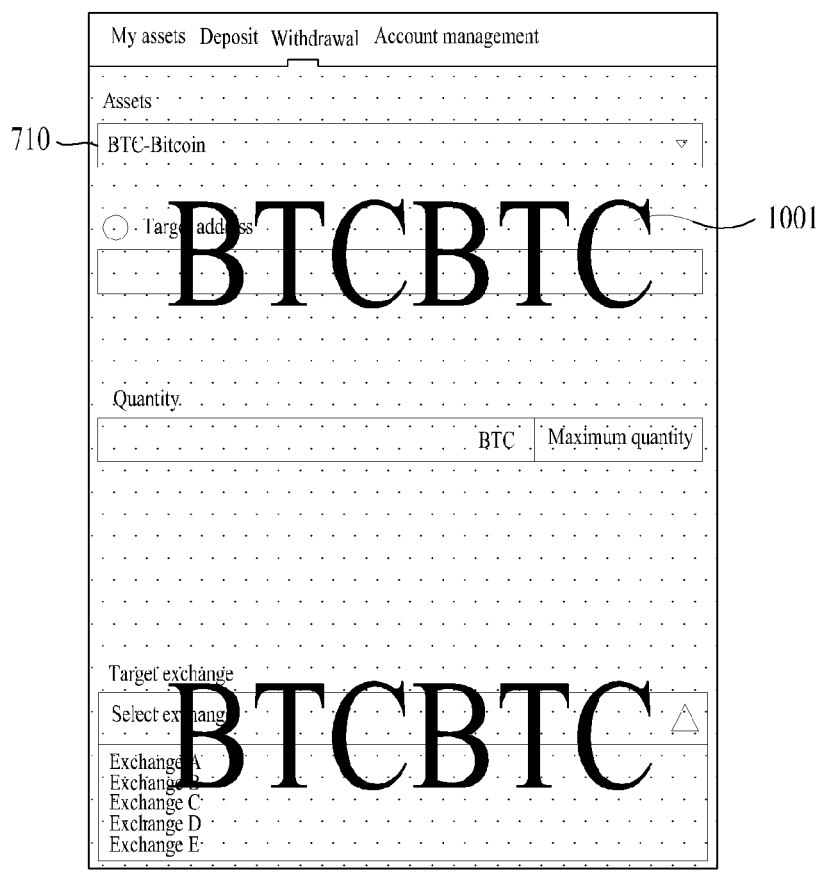
Figure 11:
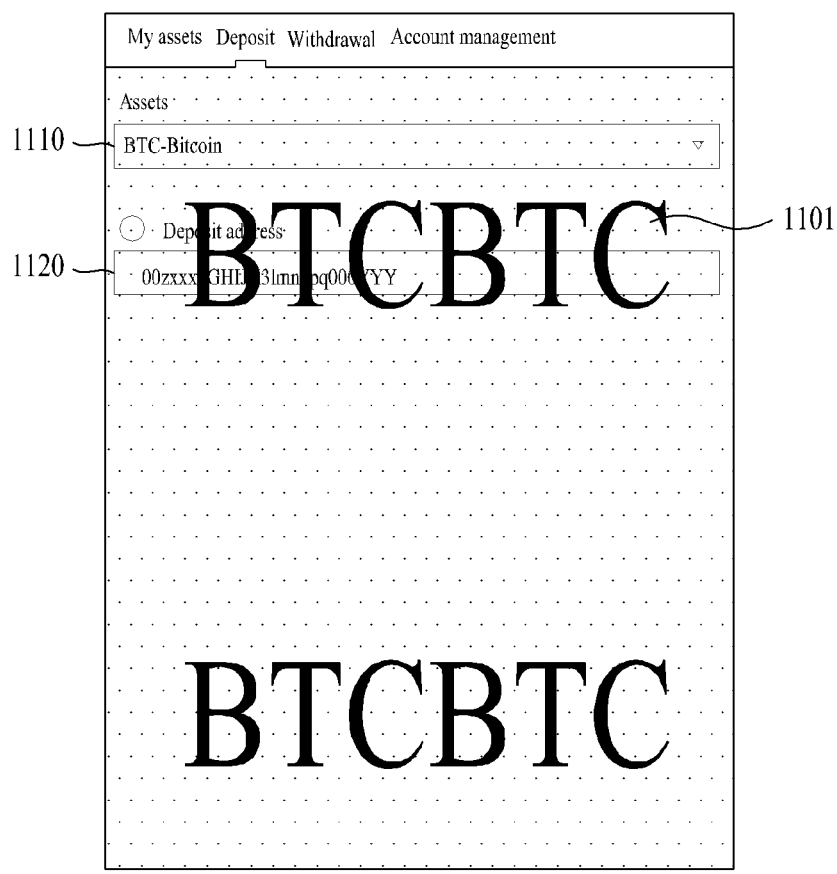
Figure 12:
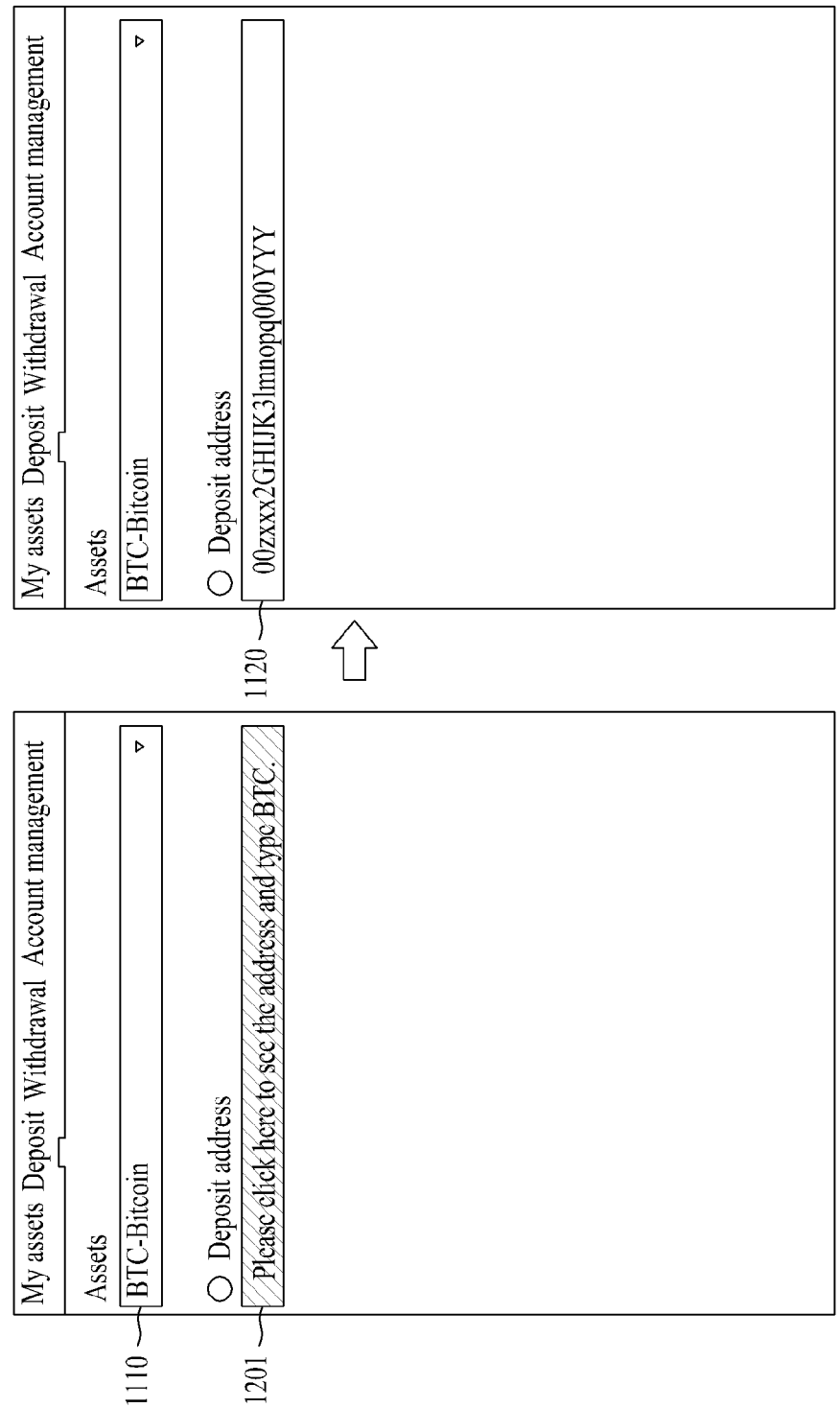

FIGS. 7 to 10 illustrate a cryptocurrency withdrawal screen 700 and FIGS. 11 and 12 illustrate a cryptocurrency deposit currency 1100.

Figure 7:
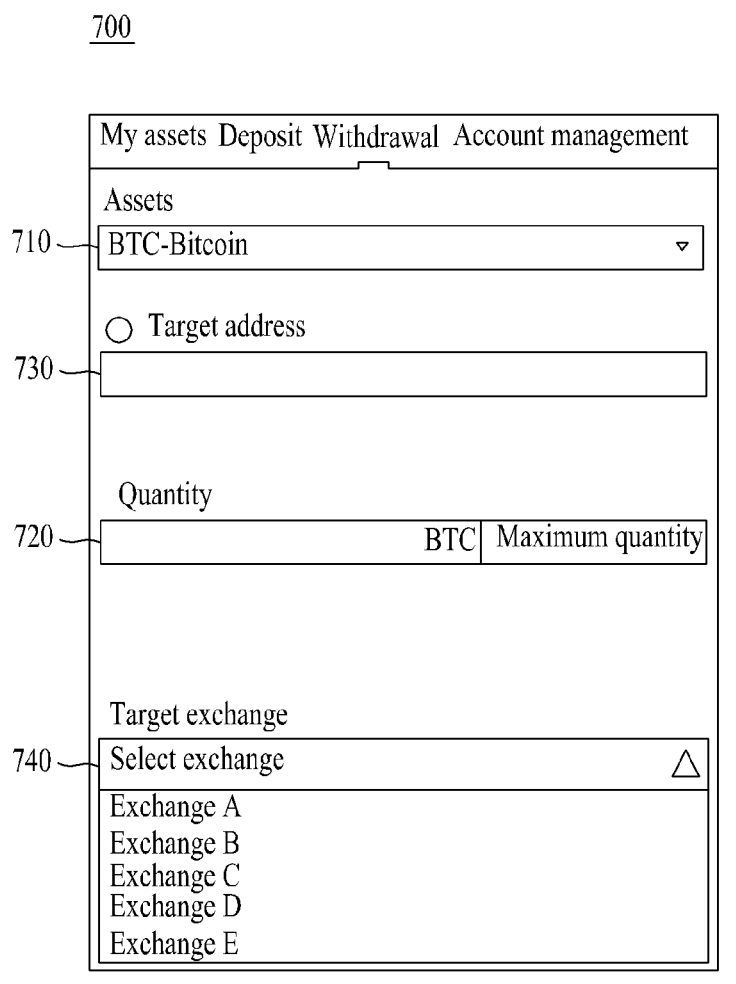

Referring to FIG. 7, the cryptocurrency withdrawal screen 700 refers to a user screen for a cryptocurrency remittance and may include an interface for inputting a target exchange with remittance request information.

The cryptocurrency withdrawal screen 700 may include a coin type input interface 710 for inputting a type of a target coin to be remitted as the remittance request information, a coin quantity input interface 720 for inputting a quantity of the target coin to be remitted, and an address input interface 730 for inputting a target address related to a remittance, that is, a recipient wallet address.

In the example embodiment, the cryptocurrency withdrawal screen 700 may additionally include an exchange input interface 740 for inputting a target exchange to prevent an erroneous deposit. The target exchange input through the exchange input interface 740 may be used as information for verifying the remittance request information. A validity of an address or a coin requested by the user may be verified by verifying an actual trading environment of the target exchange.

The example embodiment may support a plurality of functions to input more accurate information on the cryptocurrency withdrawal screen 700.

The processor 220 may provide a list of recommended addresses through the address input interface 730. For example, referring to FIG. 8, the processor 220 may manage a coin type and wallet address pair using an alias designated by a user through a separate alias address table 800. Referring to FIG. 9, when the user desires to input a recipient wallet address through the address input interface 730, the processor 220 may display an alias list 931. When the user selects a specific alias from the alias list 931, the processor 220 may automatically input a wallet address of the corresponding alias to the address input interface 730. For example, in response to a selection on alias "ABC" from the alias list 931, a wallet address of the alias "ABC" stored in the alias address table 800, that is, "1Abcdef2GHIJK3lmnopq789CC" may be automatically input to the address input interface 730.

When the type of the target coin is not input to the coin type input interface 710, the processor 220 may provide the alias list 931 as information on the entire aliases. When the type of the target coin is first input, the processor 220 may provide the alias list 931 by selecting an alias address corresponding to the coin type.

When the user desires to directly input the recipient wallet address without using the alias, the processor 220 may provide a recommendation function for an address system. The wallet address may have a regular address system according to an exchange or a coin type. The processor 220 may manage a common address system for each exchange or for each coin type and may recommend an address system that matches the target coin input to the coin type input interface 710 or the target exchange input to the exchange input interface 740. That is, the processor 220 provides a function capable of automatically inputting a common address system without a need to input each of the entire wallet addresses.

The processor 220 may display a watermark on information input from the user such that the user may easily identify information input from the user himself/herself in an information input process. Referring to FIG. 10, the processor 220 may display a coin type input to the coin type input interface 710 on the cryptocurrency withdrawal screen 700 using a watermark 1001 when a type of a target coin is input to the coin type input interface 710.

Referring to FIG. 11, the cryptocurrency deposit currency 1100 refers to a user screen for a cryptocurrency deposit and may include a coin type input interface 1110 for inputting a type of a target coin to be deposited as deposit request information. A user wallet address 1120 for deposit may be displayed on the cryptocurrency deposit currency 1100.

The processor 220 may display a watermark 1101 for information input from the user to assist an input of accurate information on the cryptocurrency deposit currency 1100 as well as on the cryptocurrency withdrawal screen 700. A corresponding coin type may be displayed using the watermark 1101 on the cryptocurrency deposit currency 1100 from a point in time at which a type of the target coin for deposit is input through the coin type input interface 1110.

The processor 220 may display the user wallet address 1120 on the cryptocurrency deposit currency 1100 after a user confirmation through a typing such that the user may accurately recognize a type of the target coin input from the user in an information input process for a deposit request.

Referring to FIG. 12, initially, the user wallet address 1120 is maintained in an unexposed state on the cryptocurrency deposit currency 1100. Here, the processor 220 induces the user to type the type of the target coin input from the user again and when content typed through a character input interface 1201 matches the type of the target coin input to the coin type input interface 1110, may display the user wallet address 1120.

When the user wallet address 1120 is in the unexposed state, a deposit request is disallowed and when the user wallet address 1120 switches to an exposed state through a final confirmation using typing, a deposit procedure may be performed according to a user request.

According to some example embodiments, it is possible to verify the validity of transaction request information using a trading environment of a target exchange input with the transaction request information. Also, according to some example embodiments, it is possible to induce more accurate information to be input through a recommendation function, a watermark, and a confirmation typing for an automatic input in an information input process for a transaction request.

The systems or apparatuses described above may be implemented using hardware components, software components, and/or a combination thereof. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of preventing an erroneous deposit of cryptocurrency executed by a computer device comprising at least one processor configured to execute computer-readable instructions included in a memory, the method comprising:
providing an interface for inputting transaction request information including a target coin and a wallet address;
verifying at least one of the target coin and the wallet address using a trading environment of a target exchange corresponding to the transaction request information; and
processing a transaction according to the transaction request information based on a result of verifying the at least one of the target coin and the wallet address,
wherein the providing of the interface for inputting the transaction request information comprises providing an interface for a user confirmation for the target coin in response to the target coin being input through the interface.

2. The method of claim 1, wherein the verifying comprises verifying the wallet address by verifying an address belonging to the target exchange.

3. The method of claim 1, wherein the verifying comprises verifying the target coin by verifying a coin type tradable in the target exchange.

4. The method of claim 1, wherein the verifying comprises verifying the wallet address by verifying a network type processible in the target exchange.

5. The method of claim 1, wherein the verifying comprises verifying the wallet address by verifying an address registered as an erroneous deposit damage case.

6. The method of claim 1, wherein the verifying comprises verifying the trading environment of the target exchange through a database system included in the computer device, another external system interactable with the computer device, or an exchange application program interface (API).

7. The method of claim 1, wherein the processing comprises:
performing a primary remittance for a portion of a transaction request quantity; and
performing an additional remittance for a remaining quantity of the transaction request quantity in response to the primary remittance being authorized.

8. The method of claim 7, wherein the performing of the primary remittance comprises remitting a quantity corresponding to a singular value that is randomly determined for the transaction request information, and
the performing of the additional remittance comprises remitting the remaining quantity in response to a success in authorization using the singular value.

9. The method of claim 7, wherein the performing of the additional remittance comprises remitting the remaining quantity in response to a success in authorization using a transaction ID that represents a transaction of the primary remittance.

10. The method of claim 1, wherein the providing comprises recommending a list of addresses managed using an alias on an interface for inputting the wallet address.

11. The method of claim 1, wherein the providing comprises recommending a list of addresses based on a user transaction history on an interface for inputting the wallet address.

12. The method of claim 1, wherein the providing comprises recommending an address system of the target coin or the target exchange on an interface for inputting the wallet address in response to the target coin or the target exchange being input first.

13. The method of claim 1, wherein the providing comprises recommending a list of exchanges that trade the target coin on an interface for inputting the target exchange in response to the target coin being input first.

14. The method of claim 1, wherein the providing comprises recommending a list of coins tradable in the target exchange on an interface for inputting the target coin, in response to the target exchange being input first.

15. The method of claim 1, wherein the providing comprises displaying a watermark on information input through the interface as a background of the interface.

16. A non-transitory computer-readable recording medium storing instructions that, when executed by at least one processor, cause the at least one processor to perform a method of preventing an erroneous deposit of cryptocurrency, the method comprising:

providing an interface for inputting transaction request information including a target coin and a wallet address;

verifying at least one of the target coin and the wallet address using a trading environment of a target exchange corresponding to the transaction request information; and processing a transaction according to the transaction request information based on a result of verifying the at least one of the target coin and the wallet address, wherein the providing of the interface for inputting the transaction request information comprises providing an interface for a user confirmation for the target coin in response to the target coin being input through the interface.

17. A computer device comprising:
at least one memory storing computer-readable instructions; and
at least one processor configured to execute the computer-readable instructions to:
provide an interface for inputting transaction request information including a target coin and a wallet address;
verify at least one of the target coin and the wallet address using a trading environment of a target exchange corresponding to the transaction request information; and
process a transaction according to the transaction request information based on a result of verifying the at least one of the target coin and the wallet address,
wherein to provide the interface for inputting the transaction request information comprises to provide an interface for a user confirmation for the target coin in response to the target coin being input through the interface.

18. The computer device of claim 17, wherein the at least one processor is further configured to verify the target coin by verifying a coin type tradable in the target exchange, or to verify the wallet address by verifying at least one of an address belonging to the target exchange and a network type processible in the target exchange.

19. The computer device of claim 17, wherein the at least one processor is further configured to perform a primary remittance for a portion of a transaction request quantity, and to perform an additional remittance for a remaining quantity of the transaction request quantity through authorization for the primary remittance.

* * * * *